United States Patent
Richardson

(10) Patent No.: US 7,386,864 B2
(45) Date of Patent: Jun. 10, 2008

(54) AUTOMATIC SERIALIZATION FOR EVENT DRIVEN MULTI-THREADED PROGRAMS IN AN OBJECT STRUCTURED SYSTEM

(75) Inventor: John J. Richardson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 10/706,776

(22) Filed: Nov. 12, 2003

(65) Prior Publication Data

US 2005/0102681 A1    May 12, 2005

(51) Int. Cl.
*G06F 9/52* (2006.01)
*G06F 15/163* (2006.01)

(52) U.S. Cl. .................. 719/321; 717/116; 717/149
(58) Field of Classification Search ............... None
See application file for complete search history.

(56) References Cited

U.S. PATENT DOCUMENTS

| | | | |
|---|---|---|---|
| 5,632,032 A | 5/1997 | Ault et al. | |
| 5,999,986 A | 12/1999 | McCauley, III et al. | |
| 6,041,384 A * | 3/2000 | Waddington et al. | 710/200 |
| 6,182,108 B1 | 1/2001 | Williams et al. | |
| 6,658,490 B1 | 12/2003 | Williams et al. | |
| 6,839,748 B1 * | 1/2005 | Allavarpu et al. | 709/223 |
| 2002/0124241 A1 * | 9/2002 | Grey et al. | 717/149 |
| 2003/0056022 A1 * | 3/2003 | Carlson et al. | 709/315 |
| 2004/0039964 A1 * | 2/2004 | Russell et al. | 714/25 |
| 2004/0078782 A1 * | 4/2004 | Clement et al. | 717/116 |
| 2004/0117369 A1 * | 6/2004 | Mandal et al. | 707/8 |
| 2004/0221261 A1 * | 11/2004 | Blevins | 717/107 |
| 2005/0005259 A1 * | 1/2005 | Avery et al. | 717/103 |

OTHER PUBLICATIONS

Peter Achten, et al., Concurrent Interactive Processes in a Pure Functional Language, in Proceedings Computing Science in the Netherlands, CSN'95, Jaarbeurs Utrecht, The Netherlands, Nov. 27-28, 1995, pp. 10-21, Stichting Mathematisch Centrum, Amsterdam.

Christopher Colby, et al., Design and Implementation of Triveni: a Process-Algebraic API for Threads+Events, in Proceedings of IEEE International Conference on Computer Languages, 1998, IEEE Computer Press.

* cited by examiner

*Primary Examiner*—William Thomson
*Assistant Examiner*—Abdou K Seye
(74) *Attorney, Agent, or Firm*—Amin, Turocy & Calvin, LLP

(57) ABSTRACT

The present invention relates to a system and methodology to facilitate automatic interactions between a client component and an object supported by an operating system framework. Various components provide automatic locking, or serialization of code execution during selected processing of events that are generated by the object and directed to the client component. The system framework provides automated synchronization services for processing events to a client program. Automated event processing can be configured such that, automated processing can be turned off for all or portions of some tasks and turned on for other tasks. In one aspect, a computer-based event handling system is provided having a framework component that supplies classes of objects that can raise events. A synchronization component automatically controls in part synchronization of access to data based on categorization of objects and/or instances defined by the framework.

25 Claims, 9 Drawing Sheets

AUTOMATIC SERIALIZATION FOR EVENT DRIVEN MULTI-THREADED PROGRAMS IN AN OBJECT STRUCTURED SYSTEM

TECHNICAL FIELD

The present invention relates generally to computer systems, and more particularly to a system and method that employs an object framework that serializes event processing to automatically mitigate race conditions associated with the event and to simplify client code generation and management for processing the event.

BACKGROUND OF THE INVENTION

Modern operating systems drive many of today's technology-based innovations by offering a platform for both hardware and software development while serving many diverse needs. These systems have evolved from more simplistic file management systems to more complex workstations that provide high-end performance at reasonable cost. Such systems often include multi-processing architectures, high-speed memory, advanced peripheral devices, a variety of system libraries and components to aid software development, and intricate/interleaved bus architectures, for example. At the heart of these systems include sophisticated operating systems that manage not only computer-related hardware but, a vast array of software components having various relationships. These components are often described in terms of objects or classes having multi-tiered relationships such as in a hierarchical arrangement for files and directories that are found in many data management systems.

Event driven programs that operate in a multi-threaded environment are generally concerned with synchronization between various components associated with the event. Such programs execute code in response to events (callbacks from a system to program supplied functions), and typically implement a state machine that responds to the event and returns. In an object structured, multi-threaded system, events may occur concurrently from the same or different objects. Due to this concurrency, the data in the program can become corrupt due to concurrent modification by two or more concurrent events.

This concurrency in the program is usually mitigated by a series of locks (code that temporally prevents other code from completion) associated with the data which serialize the sections of code that accesses that data. Manually managing this serialization can lead to errors in which locks are not utilized when they should be, or not released when the code returns. Also errors occur in which locks should be acquired and released in a consistent order, and if not—the program causes a deadlock.

The level of effort, and complexity of such program code increases with each event and data instance that is to be synchronized, thus causing writing a reliable version of the code a time consuming and difficult task. The chance of shipping a latent synchronization bug with the program increases along with this complexity since not all synchronization cases may be exercised by testing. One example environment where these type problems may exist is associated with device drivers. Device drivers are considered important components of software that allow a computer to take advantage of new hardware devices. In order to expand operating system capabilities, these systems should also provide support for new hardware devices, and provide associated device drivers.

Due to the nature of the operating system industry, a large number of device drivers are not written by the operating system manufacturer, but by outside third parties, who are typically hardware owners. Outside third parties typically do not have access to base team development resources available within the manufacturer, and are usually more concerned with quickly getting their device driver to market, otherwise they can not sell their device, and thus receive revenue. This problem is exacerbated by the fact that many of these drivers run in an unprotected kernel mode of the operating system (e.g., ring 0), which often implies that the slightest coding error may cause a system crash, or worse, a corruption to files and/or data.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to synchronization of threads in a multi-threaded event-driven environment. In an object structured system, events may occur concurrently from the same or different objects. Due to this concurrency, data in a program can become corrupt due to data modification operations that occur in accordance with two or more concurrent events. This is can be mitigated by a series of locks or serialization components associated with the data which serialize sections of code that accesses the data. Manually managing serialization via code devices such as locks, however, can lead to errors in implementation of such code. The present invention addresses this problem by employing an object structured system environment in which classes of objects raise events. The object system determines what synchronization is required for respective events based on a pre-categorization of the objects and associated instances. In this manner, the present invention provides an automated framework for managing events that simplifies code development and mitigates errors due to concurrent events.

In one example, if an object structured system environment or model is provided for a program in which classes of objects raise events, the object system can also determine what synchronization is required for respective events based on a pre-categorization of the objects and related instances. If the object system also provides the ability for the program to associate its data with system objects, and this data is accessed from under associated event handlers, then the object system can automatically provide synchronization of the program's data access based on its object synchronization categorization. This places the burden of deciding when to synchronize, and in what order, on the object system or model rather than the program thereby relieving programmers of such burden.

The object system generally provides per object instance storage on behalf of the program, wherein the storage can be allocated based on an initialization request by the program. When events occur, the object system provides a pointer and/or reference to this storage, for example. When an event occurs, and the object system performs a callback into the program, it examines current locks being held, and based on a pre-determined model, automatically acquires a suitable lock and call into the program. The program can then access the data without concerns for concurrency, other than defined by the model. When executable code that handles the event in the program returns, the lock is automatically released by the object system. This model also provides the ability for the program to specify a pre-determined synchronization or concurrency "level" to the object system at initialization and before events occur. This allows for locking to be fine-tuned based on actual data access requirements of the program.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate automatic interactions between a client component and an object supported by an operating system framework. Various components provide automatic locking, or serialization of code execution during selected processing of events that are generated by the object and directed to the client component. The system framework provides automated synchronization services for processing events to a client program (e.g., a device driver), wherein the object provided by the framework can be represented by a "handle" in which the client or device driver may request additional memory to be allocated and associated with the object for its use. Also, automated event processing can be configured such that, automated processing can be turned off for all or portions of some tasks and turned on for other tasks. In one aspect, a computer-based event handling system is provided having a framework component that supplies classes of objects that can raise events. A synchronization component automatically controls in part synchronization of access to data based on categorization of objects and/or instances defined by the framework.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
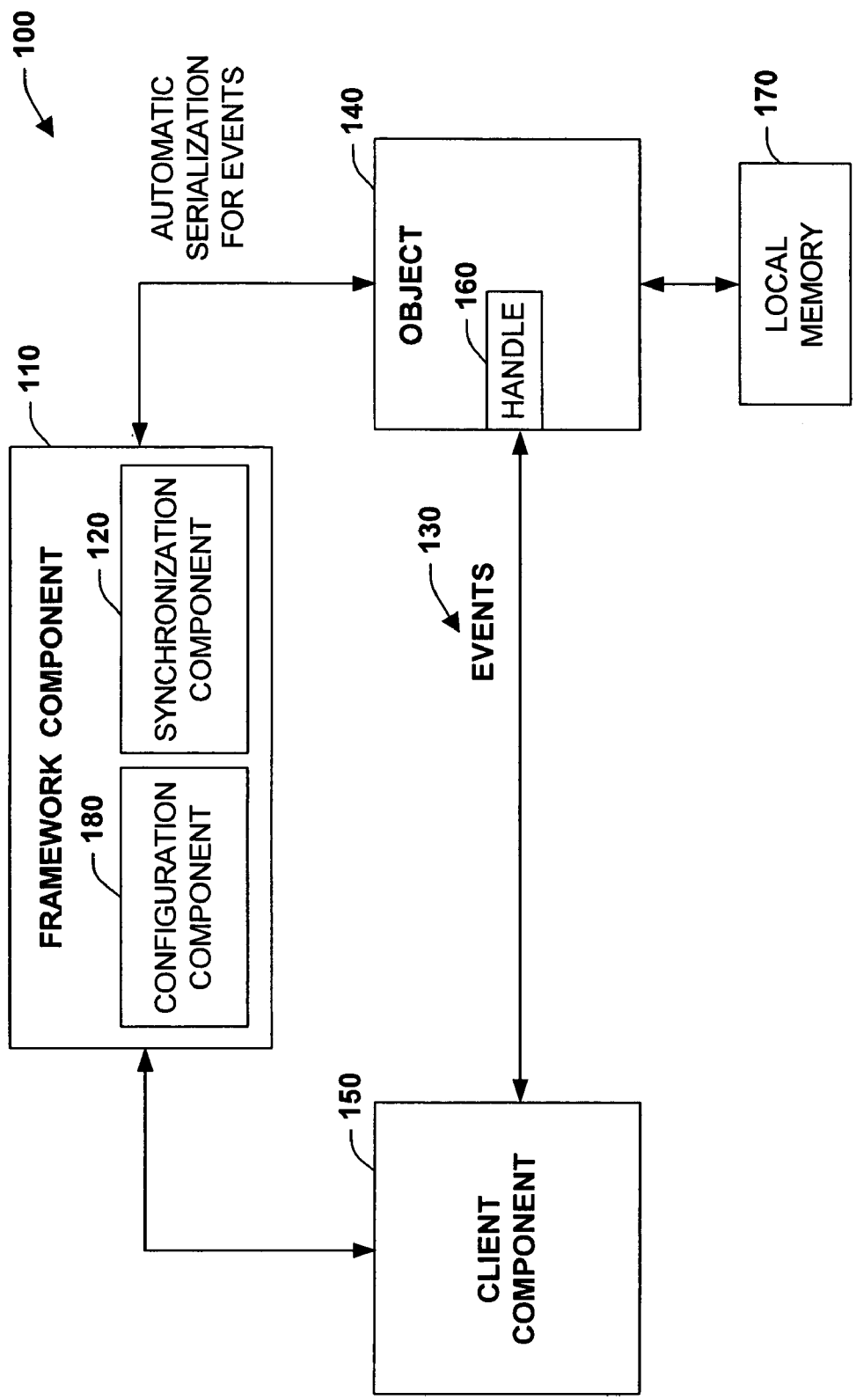
FIG. 1 is a schematic block diagram of an event handling system and model in accordance with an aspect of the present invention.

Referring initially to FIG. 1, an event handling system and model 100 is illustrated in accordance with an aspect of the present invention. The system 100 includes a framework component 110 having a synchronization component 120 that provides automatic serialization for events 130 that are raised by one or more objects 140. The framework 110 is generally supplied by an operating system, a library that a client component links with, and/or a re-distributable shared library (not shown), wherein the framework, synchronization component 120, and/or associated object 140 automatically manages or serializes the events in order that a client component 150 can process other desired tasks at hand (e.g., process driver-specific tasks rather than processing timing issues). For example, one implementation of the client component 150 can be as a device driver that operates system hardware.

The events 130 are managed to allow one or more aspects of the events to occur in a one-at-a-time manner and in accordance with a serialized process. To continue the driver example, the object 150 may provide events as a request, a cancel request, and a request complete. Generally, in order to avoid race conditions, the request complete should be called once. However, in processing the request and/or cancel request, and considering various events that may occur concurrently, the client program in a conventional system would have to provide serialization code or "locks" to prevent more that one event from possibly completing the request more than once. In the subject invention, the framework 110 and/or object 140 automatically provide serialization via the synchronization component 120.

As illustrated, the object 140 may provide a handle 160 to enable the client component 150 to manipulate the object and request additional local memory 170 to be allocated for processing client tasks. Also, a configuration component 180 (e.g., Application Programming Interface (API)) may be provided to enable the client component 150 to disable and/or enable automated serialization and synchronization. It is noted that although examples such as device driver are given for the client component 150, that the client component can be substantially any component that interacts with an operating system framework and automated serialization in accordance with the present invention. The following describes one particular example implementation of the system 100.

The framework 110 can provide events to a device driver though a series of callback functions registered by the device driver. Each framework object 140 generally defines its own events, but a common pattern of handling event serialization is typically employed to unify the concepts across the framework. One problem of serialization involves the amount of concurrency that a device driver (or client) is prepared to handle. In a conventional Model, device drivers have a fully concurrent environment in which threads may run on multiple processors, be preempted when running at lower than DISPATCH_LEVEL, for example, or pre-empted by interrupt handlers. The complexity of concurrency management with a mixture of IRQL levels, thread pre-emption and suspension rules, and different context specific synchronization objects and techniques make it complicated to write device drivers in which there is confidence that race conditions have been processed in a suitable manner.

To assist a driver writer or code designer, the framework 110 offers configurable serialization that allows simpler techniques to achieve a desired level of performance, while still allowing a more complex driver to turn off the serialization and achieve behavior with a possible increase in performance. A serialization technique offered by the framework 110 can exploit the event driven nature of a device driver or component. For example, the device driver performs most of its processing as a result of events either from the operating system, a device, or another driver.

A typical event can be represented as a C callback function registered with the driver which is invoked by the framework 110 when the event occurs. Within this C function, the driver processes the event, possibly forwarding it to another driver, changes internal state, and returns from an event handler. Any "blocking" or waiting within the event handler generally occurs for short periods of time allotted for synchronization to data structures, or a suspension due to a page fault in a page-able region, for example. The driver generally does not wait within this handler for a long-term operation to occur, but essentially either queues it, or starts Input/Output (I/O) on the handler marking appropriate state and returns.

This is opposed to a synchronous or "blocking" model in which a read event handler submits the read, and then waits within the read event handler for an event signaled by the device when the read is complete. This is due to the packet-based nature of the I/O. The framework 110 is structured around state full objects that allow the device driver to register events, and provide API's. These objects are represented by the handle 160 passed to the device driver. The framework 110 allows the device driver to allocate additional memory 170 for its own use via the objects handle. The object oriented nature of the framework 110 encourages a device driver to store its working data in this allocated "object extension", or "object context" memory 170 that is related to the object for access within event handler functions.

If access to the driver's data residing in the context memory 170 occurs from within the object's event handlers, the concurrency of these accesses will follow from the concurrency of the event handlers on the object. If the framework 110 provides mechanisms to allow the driver to control this concurrency, this burden can be placed on the framework by automatically serializing the execution of these event handlers. The overall structure of the driver's data within the object's context memory 170 along with its event driven, non-blocking nature is useful for providing a model in which the device driver can rely on the framework for the bulk of its concurrency management and serialization.

Figure 2:
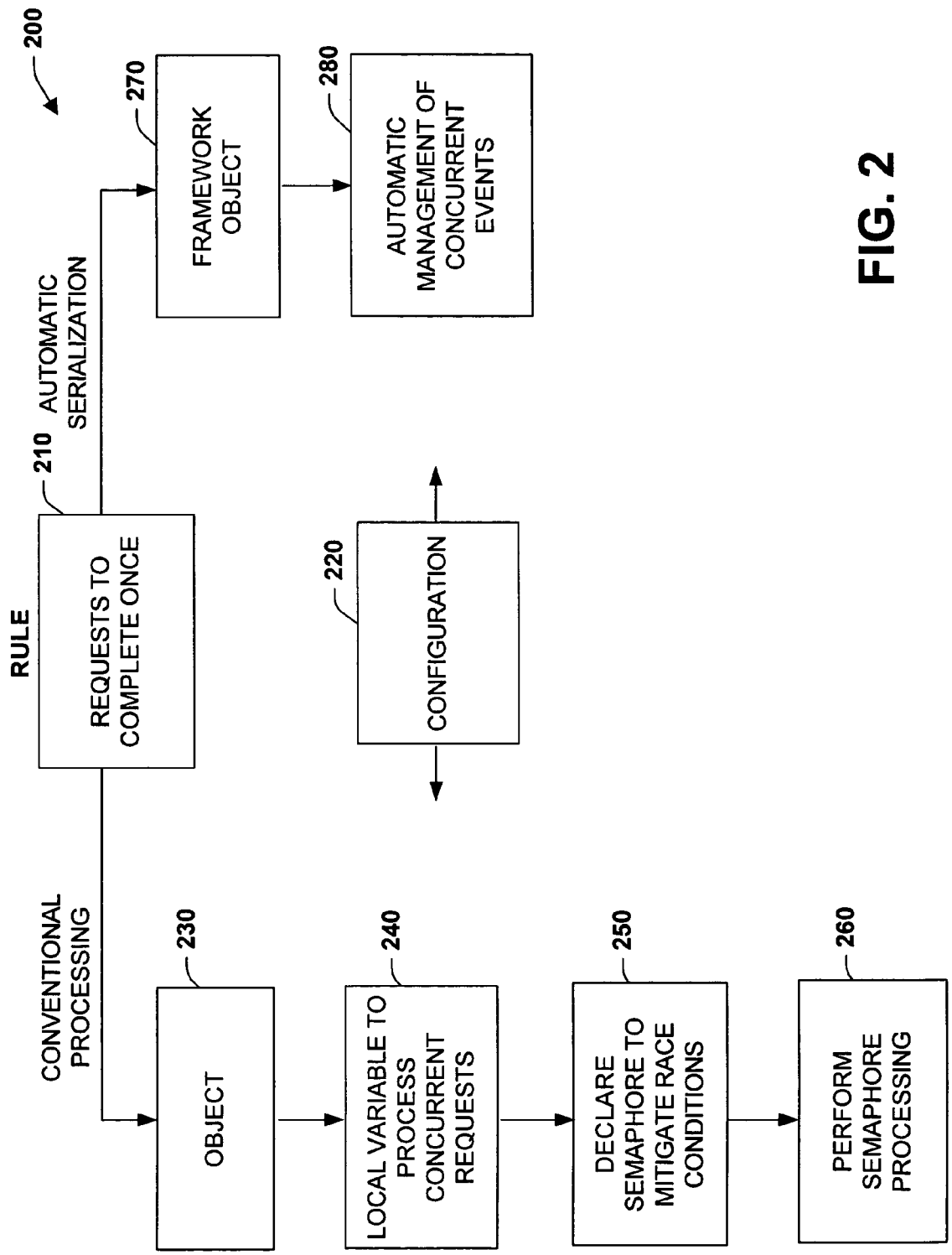
FIG. 2 is a flow diagram of an example serialization process in accordance with an aspect of the present invention.

FIG. 2 is a flow diagram illustrating event-handling processes in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 2, two example event-handling processes 200 are illustrated in accordance with an aspect of the present invention. In general, a rule 210 is defined that respective requests associated with an event are to be processed once. To the left of the rule 210, manual processes are illustrated for processing the event that are more in-line with conventional processes. To the right of the rule 210, automated processes in accordance with the present invention are illustrated. As noted above, a configuration component 220 can be provided to enable developers to switch between manual and automated processing. Such configuration can be provided by an Application Programming Interface (API) or other component, for example. The following description is provided as an example of manual and automatic processing in accordance with the present invention. It is to be appreciated that automated event serialization and processing can be provided in substantially any multi-threaded environment that employs operating system components, client components, and framework for serializing the events in order to mitigate such processing on behalf of the client.

As noted above, the present invention describes automatic locking, or serialization of code execution. This concept is based on an object provided by a system software framework. The system software framework provides its services to a client program, in an example case, a device driver. In general, the object provided by the framework is represented by a "handle", in which the client, or device driver is allowed to request additional memory to be allocated and associated with the object for its use. The objects represented in this example are a Queue object that presents requests to a driver, and a Request object that represents an I/O request (e.g., could be transfer count, pointers to buffers, and so forth). A request is generally completed by calling a RequestComplete function or method. In the following example, a Queue object provides the following three events, for example:

QueueRequest—Notification of arrival of a request to service;

QueueRequestCancel—Notification by the Queue that an application wants to cancel the request; and QueueRequestComplete—Notification by the operating system and/or hardware that the requests transfer of data has been completed.

As previously noted, the rule 210 generally requires that a request cannot be completed more than once, even if it's cancelled. The device driver is thus responsible for calling RequestComplete once, from either the QueueRequestCancel, or the QueueRequestComplete handlers. Generally, system organization is such that any of these events may occur concurrently unless the Queue object provides a synchronization or serialization service on behalf of the client device driver. The following code examples illustrate client-side processing of the events. Proceeding to 230, an object is created as in the following example:

```
//
// This describes a C structure to format data the client program
// (e.g., device driver) associates with the system object.
//
// This data structure is retrieved by the driver with an
// ObjectGetContext( ) API, for example.
//
struct Request;
typedef struct_DRIVER_DATA {
    struct Request* CurrentRequest;
} DRIVER_DATA, *PDRIVER_DATA;
//
// The following demonstrates that the client device driver has created
// a Queue object with additional memory to store its
// DRIVER_DATA structure defined above.
//
// It also registers function pointers for its event handlers.
//
Driver_Setup(
    )
{
    // Create a Queue specifying driver data, and handler functions
    QueueCreate(
        sizeof(DRIVER_DATA),
        QueueRequest,
        QueueRequestCancel,
        QueueRequestCompleted
        );
}
//
// Conventional Queue request handler functions with a built in race
// condition that can lead to a request being completed more than once
//
void
QueueRequest(
    Queue* Queue,
    struct Request* Request
    )
{
    PDRIVER_DATA context = ObjectGetContext(Queue);
    context->CurrentRequest = Request;
    // .. start I/O
    return;
}
void
QueueRequestCancel(
    Queue* Queue,
    struct Request* Request
    )
{
    PDRIVER_DATA context = ObjectGetContext(Queue);
    if( context->CurrentRequest != NULL ) {
        RequestComplete(context->CurrentRequest, CANCELLED);
        //
        // QueueRequestCompleted could be running at the same time
        // and calling RequestComplete on the same request as
        // context->CurrentRequest.
        //
        // Both routines could test context->CurrentRequest at the same
        // time finding it != NULL, and both call RequestComplete
        // before clearing it.
        //
```

Proceeding to 240 of the process 200, a local variable may be employed as follows to mitigate race conditions.

```
        // Storing the CurrentRequest in a local variable and setting
        // to NULL right away narrows the window of the race
        // condition, but does not eliminate it.
        //
        context->CurrentRequest = NULL;
    }
    return;
}
void
QueueRequestCompleted(
    Queue* Queue,
    struct Request* Request
    )
{
    PDRIVER_DATA context = ObjectGetContext(Queue);
    if( context->CurrentRequest != NULL ) {
        RequestComplete(context->CurrentRequest, COMPLETED);
        //
        // QueueRequestCancel could be running at the same time and
        // calling RequestComplete on the same request at
        // context->CurrentRequest.
        //
        // Both routines could test context->CurrentRequest at the same
        // time finding it != NULL, and both call RequestComplete
        // before clearing it.
        //
        // Storing the CurrentRequest in a local variable and setting
        // to NULL right away only narrows the window of the race
        // condition, but does not eliminate it.
        context->CurrentRequest = NULL;
    }
    return;
}
```

At 250 of the process 200, a semaphore can be employed to further mitigate race conditions.

```
//
// A typical application can extend DRIVER_DATA structure to use
// a semaphore which provides mutual exclusion.
//
```

At 260, code can be provided to perform semaphore processing as follows:

```
// Acquiring and releasing the semaphore is a manual client process
// in which the driver developer examines the code for races and inserts
// the proper calls
typedef struct_DRIVER_DATA {
    struct Request* CurrentRequest;
    struct Semaphore* Lock;
} DRIVER_DATA, *PDRIVER_DATA;
void
QueueRequest(
    Queue* Queue,
    struct Request* Request
    )
{
    PDRIVER_DATA context = ObjectGetContext(Queue);
    AcquireLock(context->Lock);
    context->CurrentRequest = Request;
    ReleaseLock(context->Lock);
    // .. start I/O
    return;
}
void
QueueRequestCancel(
    Queue* Queue,
    struct Request* Request
    )
{
```

-continued

```
    PDRIVER_DATA context = ObjectGetContext(Queue);
    AcquireLock(context->Lock);
    //
    // The serialization semaphore prevents QueueRequestCompleted
    // from running until ReleaseLock occurs.
    //
    if( context->CurrentRequest != NULL ) {
        RequestComplete(context->CurrentRequest, CANCELLED);
        context->CurrentRequest = NULL;
    }
    ReleaseLock(context->Lock);
    return;
}
void
QueueRequestCompleted(
    Queue* Queue,
    struct Request* Request
    )
{
    PDRIVER_DATA context = ObjectGetContext(Queue);
    AcquireLock(context->Lock);
    //
    // The serialization semaphore prevents QueueRequestCancel from
    // running until ReleaseLock occurs.
    //
    if( context->CurrentRequest != NULL ) {
        RequestComplete(context->CurrentRequest, COMPLETED);
        //
        // QueueRequestCancel could be running at the same time and
        // calling RequestComplete on the same request at
        // context->CurrentRequest.
        //
        context->CurrentRequest = NULL;
    }
    ReleaseLock(context->Lock);
    return;
}
```

The above sequence of code provides manual-locking procedures (e.g., those implemented in the client program) to mitigate potential race conditions. If a framework created object is employed at 270 however, automatic management of concurrent events is provided by the framework at 280. As can be observed from the following sequence, client code is much easier to implement when automatic serialization of events is employed.

```
//
// The following code appears like the example above, however with the
// present invention's automatic serialization, any data in the associated
// DRIVER_DATA context is protected in the event handlers.
//
// No explicit driver managed semaphore is required to prevent race
// conditions since each handler runs exclusive against each other.
//
void
QueueRequest(
    Queue* Queue,
    struct Request* Request
    )
{
    PDRIVER_DATA context = ObjectGetContext(Queue);
    context->CurrentRequest = Request;
    // .. start I/O
    return;
}
void
QueueRequestCancel(
    Queue* Queue,
    struct Request* Request
    )
{
    PDRIVER_DATA context = ObjectGetContext(Queue);
```

-continued

```
    //
    // This handler will run to completion before
    // QueueRequestCompleted is called.
    //
    if( context->CurrentRequest != NULL ) {
        RequestComplete(context->CurrentRequest, CANCELLED);
        context->CurrentRequest = NULL;
    }
    return;
}
void
QueueRequestCompleted(
    Queue* Queue,
    struct Request* Request
    )
{
    PDRIVER_DATA context = ObjectGetContext(Queue);
    //
    // This handler will run to completion before
    // QueueRequestCanceled is called.
    //
    if( context->CurrentRequest != NULL ) {
        RequestComplete(context->CurrentRequest, COMPLETED);
        context->CurrentRequest = NULL;
    }
    return;
}
```

Figure 3:
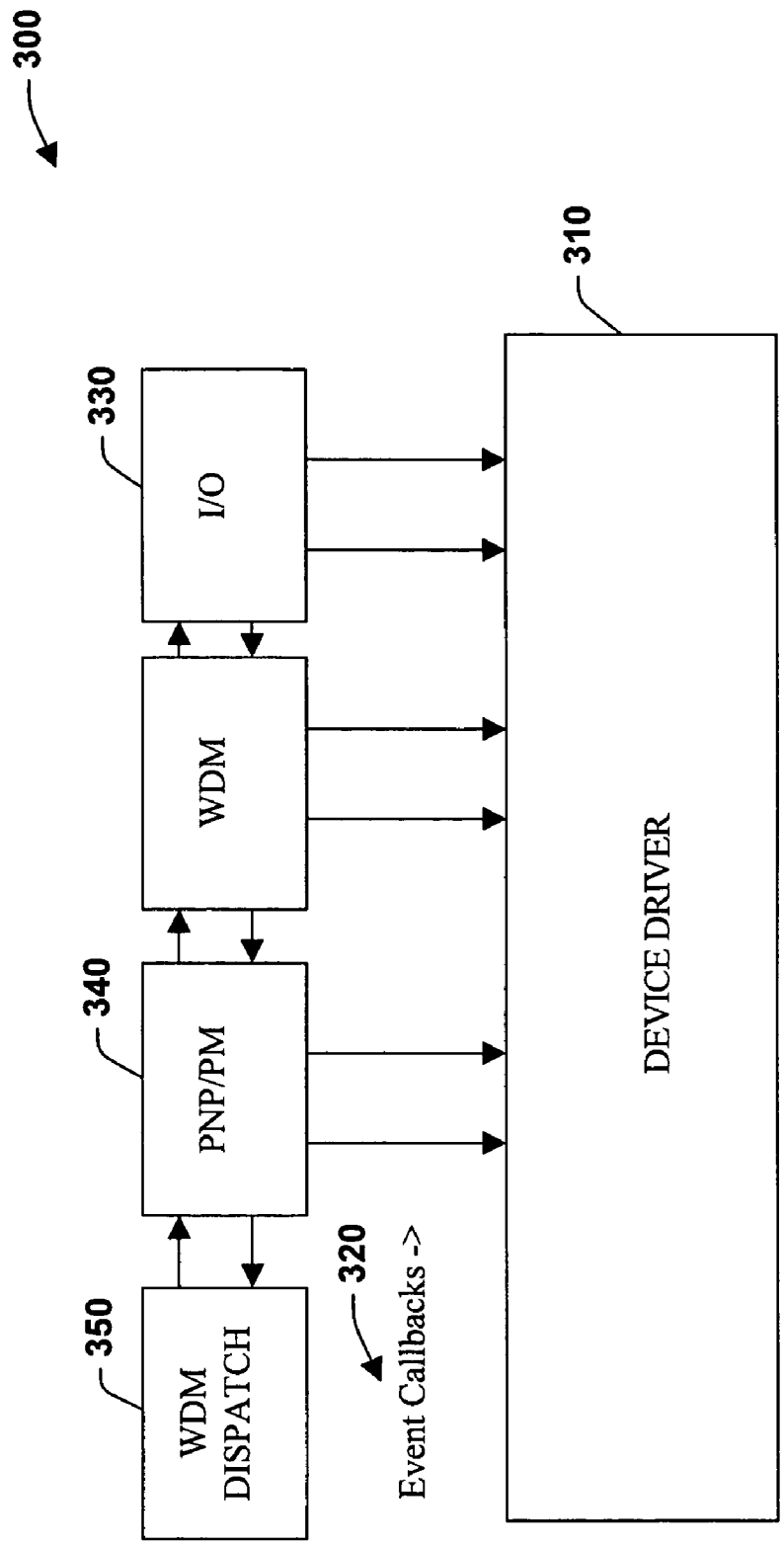
FIG. 3 is a schematic block diagram illustrating an example pipeline architecture for event handling in accordance with an aspect of the present invention.

Turning to FIG. 3, a system 300 illustrates an example pipeline architecture for event handling in accordance with an aspect of the present invention. The system 300 provides a logical view of a request pipeline and the relationship between the various stages of processing. The Request Pipeline provides an exemplary model for the interaction of framework events across a device driver 310. The pipeline employs the concept of a series of stages that a request traverses in the processing of a Windows Driver Model (WDM) request, and/or I/O Request Packet (IRP). Objects within each stage of the pipeline may raise an event to the device driver 310 through an event callback at 320 to allow the driver to have control of which action to take, or provide some default action that may result in the requests completion, or forwarding to the next stage. If a request eventually reaches the end of the pipeline without being accepted by the device driver 310 or by automatic processing in a stage, a default processing of the request occurs. The default processing can depend on whether the driver is configured as a Filter Driver in which the request is forwarded to the next lower device driver, or a non-filter driver in which case the request is completed with a STATUS_INVALID_DEVICE_REQUEST, for example.

Each stage of the pipeline may have its own rules and configuration for how events are handled. For example, an I/O stage 330 for Read, Write, and Device Control events has great flexibility under WDM rules (or other type) to defer requests such that they may be presented at DISPATCH_LEVEL or PASSIVE_LEVEL according to configuration by the device driver 310. A Plug and Play Stage 340 typically operates at PASSIVE_LEVEL since most of the API's a driver's event handler may call will cause a fault if called from a DISPATCH_LEVEL at 350. This can result in a discontinuity between allowable configurations of Power events and I/O events.

Synchronizing between PASSIVE_LEVEL events in one stage and DISPATCH_LEVEL events in another can be somewhat complicated, and is generally handled by a framework component for common events. The mechanism the framework provides is to allow configurable events from one stage to be forwarded to the next stage, so that the stage may notify the driver 310 under its configured constraints. A driver event callback handler for a particular stage is usually responsible for performing the action required within that stage. Generally, each stage in the pipeline defines its own serialization behavior, which may be fixed in the case of the PnP stage 340, but more flexible in the case of I/O 330. A default serialization behavior can be set at driver creation time by providing a WDF_CALLBACK_CONSTRAINTS_CONFIG structure to WdfDriverCreate, but may be overridden by the configuration for a specific stage when it is initialized.

Figure 4:
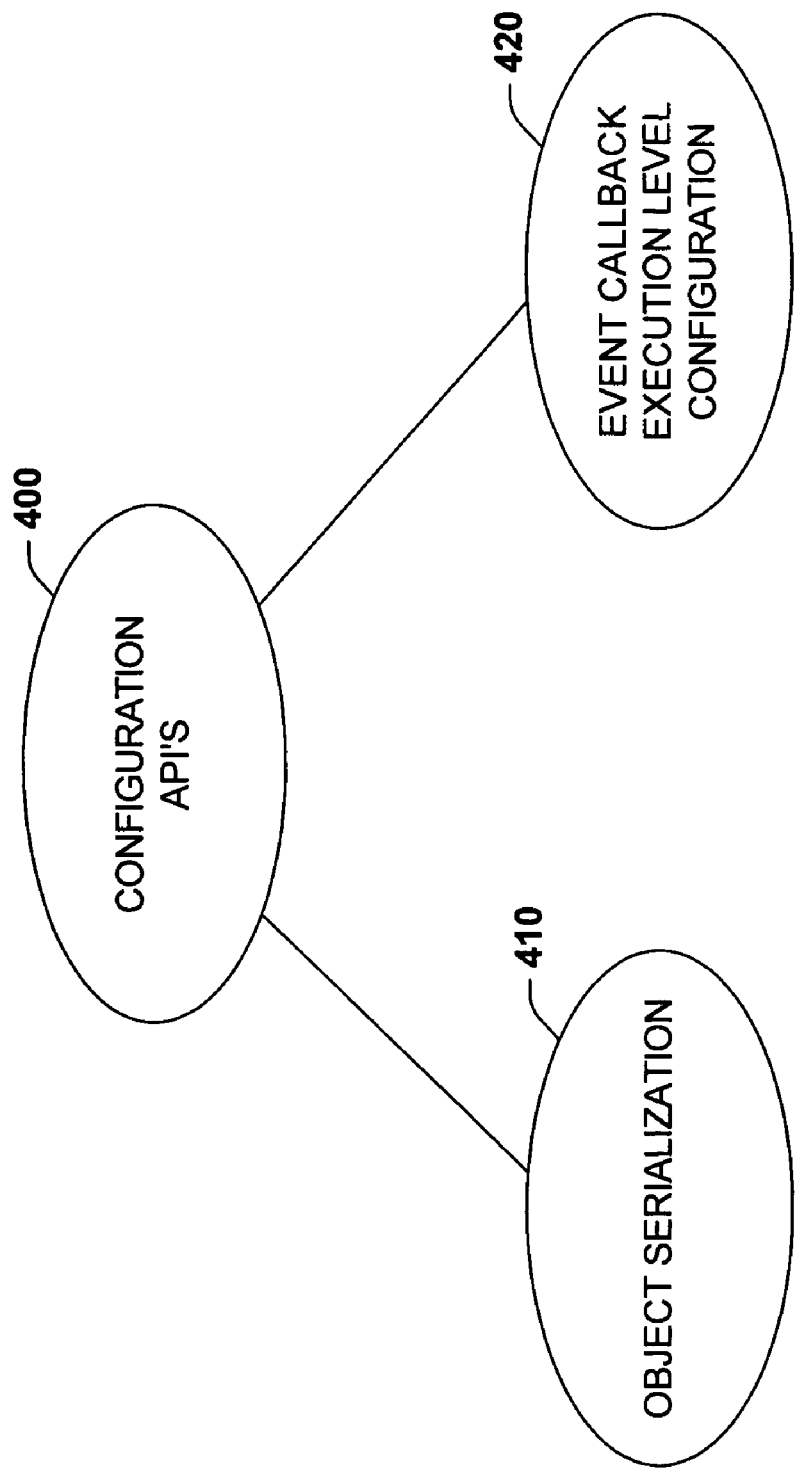
FIG. 4 is a diagram illustrating an example configuration Application Programming Interfaces in accordance with an aspect of the present invention.

FIG. 4 is a diagram illustrating example configuration Application Programming Interfaces 400 in accordance with an aspect of the present invention. As noted above, respective stages define the serialization model for the events that it raises. Some stages, such as I/O, have configurable serialization to allow the device driver to control the balance between complexity and performance. For stages that have configurable serialization, these basic serialization types are used to describe the options that are described in more detail below. Object serialization configuration API's 410 may include:

WdfSerializationScopeDevice

Serialization of events occurs at the WDFDEVICE level. Generally, one event handler associated with the WDFDEVICE or any of its child objects may be running at given time.

WdfSerializationScopeObject

Serialization of events occurs at a WDFOBJECT level. Events are typically serialized against other events on the same object handle.

WdfSerializationScopeNoneSpecified

When no serialization is performed by the framework, and events may occur at various levels of concurrency depending on device and system configuration such as number of requests, number of system processors, etc. The default for an object and/or stage that supports serialization in which none was specified is WdfSerializationScopeDevice.

At 420, Object Event Callback Execution Level Configuration can be provided. When the framework invokes an event callback to the device driver, it may be running at various IRQL levels depending on the configuration of its environment. A device driver may desire its event callbacks to be invoked at no higher than a specific IRQL level. To support this, the framework supports a configuration to allow the device driver to specify the maximum IRQL level it can handle. The synchronization levels supported are defined in a WDF_EXECUTION_LEVEL enumeration in an associated API described below. The execution level configuration 420 can also support:

WdfExecutionLevelPassive

Event callbacks to the device driver generally occur at a PASSIVE_LEVEL. If a WDM IRP arrives at the device driver above PASSIVE_LEVEL, the callback is deferred to a system work item. Though PASSIVE_LEVEL callbacks can access page-able code and data, they cannot automatically synchronize with WDFDPC and WDFTIMER objects, and thus performed manually using WdfObjectAcquireLock, and WdfObjectReleaseLock.

WdfExecutionLevelDispatch

Event callbacks to the device driver may occur at any level up to and including DISPATCH_LEVEL. The device driver may not access any page-able code or data, or call any wait-able API's. The actual level on each callback may vary depending on the drivers and systems configuration. Any event callback handler should be prepared for the callback to be at DISPATCH_LEVEL, even if a previous call was at a lower level.

WdfExecutionLevelNoneSpecified

The device driver does not specify any specific IRQL, and the framework is free to invoke its event callbacks at any level from PASSIVE_LEVEL to DISPATCH_LEVEL. Which level occurs depends on the configuration of the device driver and the system.

Figure 5:
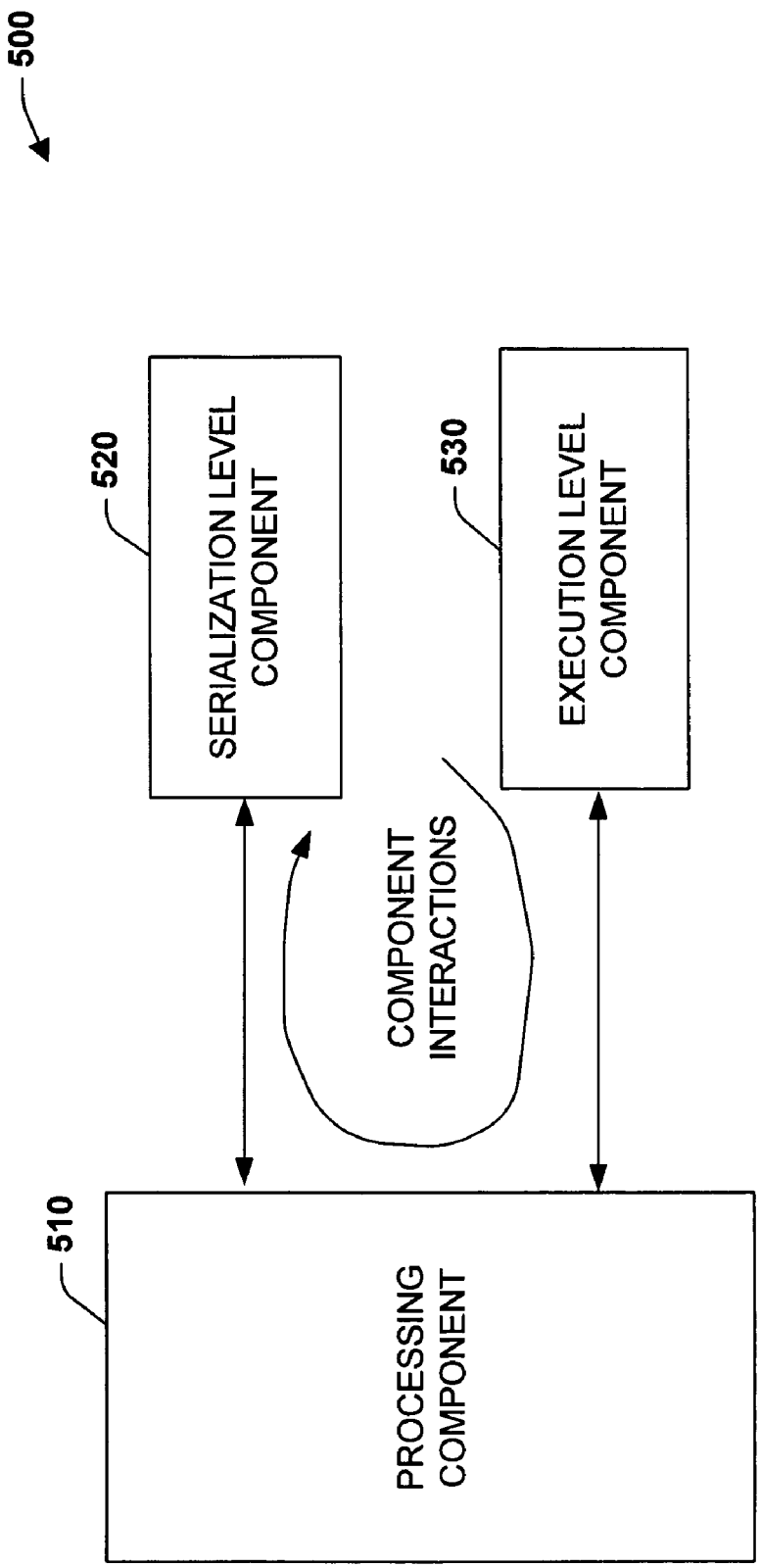
FIG. 5 is a diagram illustrating example component interactions for an event handling system in accordance with an aspect of the present invention.

FIG. 5 is a system 500 illustrating example component interactions for an event handling system in accordance with an aspect of the present invention. The system 500 may include a processing component 510 that facilitates interactions between a serialization level component 520 and an execution level component 530. When Serialization of callbacks is specified (e.g., WdfSerializationScopeDevice, WdfSerializationScopeObject), the execution level of the callbacks is generally specified to be WdfExecutionLevelPassive, or WdfExecutionLevelDispatch. If WdfExecutionLevelPassive is selected, automatic serialization of certain objects event callbacks such as WDFTIMER, WDFDPC, and the WDFDPC embedded in the WDFINTERRUPT object cannot occur. Due to internal mechanisms, a spinlock can be employed to synchronize execution of the event callback handlers, and thus, holding a spinlock raises execution level to DISPATCH_LEVEL. Serialization with the event callbacks of these objects may occur manually by the device driver using WdfObjectAcquireLock and WdfObjectReleaseLock to build critical sections around access to shared data. Since acquiring the lock on a DISPATCH_LEVEL object raises the current execution level to DISPATCH_LEVEL, these sections should not access page-able code and data, or API's.

In addition, a driver may perform whatever processing is required within the DPC (Deferred Procedure Call) or TIMER handler, and then queue a WDFWORKITEM that is serialized with the callbacks at PASSIVE_LEVEL to perform further detailed processing. If WdfExecutionLevelDispatch is selected, automatic serialization of these objects can occur, but the device driver cannot access paged code or data, or call API callbacks that are not available from DISPATCH_LEVEL. If Serialization is specified, and WdfExecutionLevelNonSpecified is selected, a verifier assert can occur and the object create API with this constraint can fail. This is to allow the device driver writer to make it clear which trade off is being selected.

Figure 6:
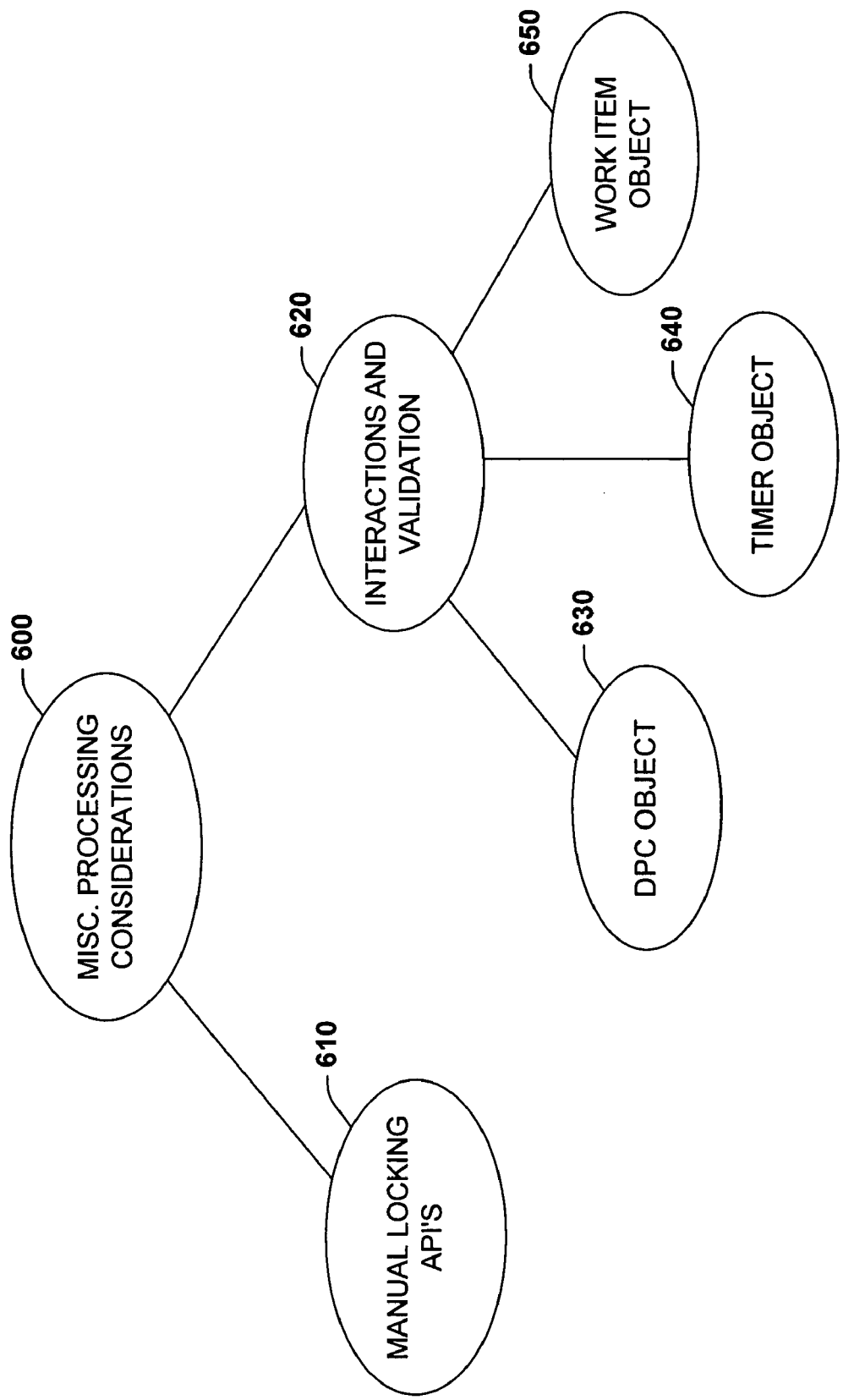
FIG. 6 is a diagram illustrating miscellaneous processing in accordance with an aspect of the present invention.

FIG. 6 is a diagram illustrating miscellaneous processing considerations 600 in accordance with an aspect of the present invention. At 610, manual locking API's can be provided. In some cases, code that runs outside of an event callback may need to serialize with code running inside an event callback. To accomplish this serialization, two API functions are provided that allow the driver to bracket a serialization block based on the object's handle as follows:

void WdfObjectAcquireLock(WDFHANDLE Object)—Begins a serialization block, possibly raising current IRQL.

void WdfObjectAcquireUnlock(WDFHANDLE Object)—Ends a serialization block, possibly lowering the current IRQL. These API's can cause a verifier assert under the following conditions:

If the object specified by the handle does not support serialization

The object does not support event callbacks to the device driver, thus not requiring serialization The serialization lock is already held, due to a previous call to WdfObjectAcquireLock, or executing within an event callback handler that has automatically acquired it based on the serialization scope configuration.

If the caller is running at an improper IRQL level for the Execution Level configuration of the object.

For example, if an object is configured for WdfExecutionLevelPassive, calling while running at DISPATCH_LEVEL is considered invalid.

Proceeding to 620, component interactions and validation are considered. The framework Serialization model allows considerable flexibility for device drivers to configure serialization behavior and constraints. Due to some realities of the operating environment, interactions between these constraints and Framework API's can allow some invalid behavior. Affected API's can include a DPC object 630, a timer object 640, and a work item object 650 and are described as follows:

DPC Object

If a handle to an object configured for WdfExecutionLevelPassive is passed to a WdfDpcCreate, the call should fail with STATUS_INVALID_PARAMETER unless automatic serialization of the WDFDPC is disabled. This is due in part that a WDM DPC can pre-empt PASSIVE_LEVEL code, and there is generally not a strait forward way to ensure that any PASSIVE_LEVEL event handlers are not pre-empted by the DPC. One solution is to use a WDFWORKITEM object which synchronizes with PASSIVE_LEVEL, which may be queued from the WDFDPC handler. Since a WDFWORKITEM involves the scheduling of a system thread, lightweight operations may want to occur from within the WDFDPC handler on an otherwise PASSIVE_LEVEL object. As long as the memory accessed is not page-able, the device driver may use its own spinlock to protect any data within a region that is shared between the objects event handlers and the WDFDPC. In addition, the interlocked operations may be utilized as well to avoid in some cases of having to allocate a spinlock. It is generally not valid to call WdfObjectAcquireLock and WdfObjectReleasLock on an object that is serialized to PASSIVE level.

TIMER Object

Internally, a WDFTIMER employs a WDFDPC, thus, similar rules for a WDFDPC applies to a WDFTIMER.

WORKITEM Object

A WDFWORKITEM object executes at PASSIVE_LEVEL, and is used to access an object configured for PASSIVE_LEVEL serialization. It typically involves additional overhead than a WDFDPC object since it involves the scheduling of a system thread, where as the WDFDPC can interrupt any thread executing below DISPATCH_LEVEL. For this reason, a WDFWORKITEM object does not allow automatic synchronization to an object that is using DISPATCH_LEVEL serialization since this would mitigate the benefit of using a WDFWORKITEM. Instead, use the lighter weight WDFDPC object. A WDFWORKITEM object may configure itself to not provide automatic serialization, and manually synchronize to DISPATCH level for short blocks of code in which ii serializes with data accessed from DISPATCH_LEVEL. It is considered valid to call WdfObjectAcquireLock and WdfObjectReleaseLock on an object that is serialized at DISPATCH or PASSIVE level.

Figure 7:
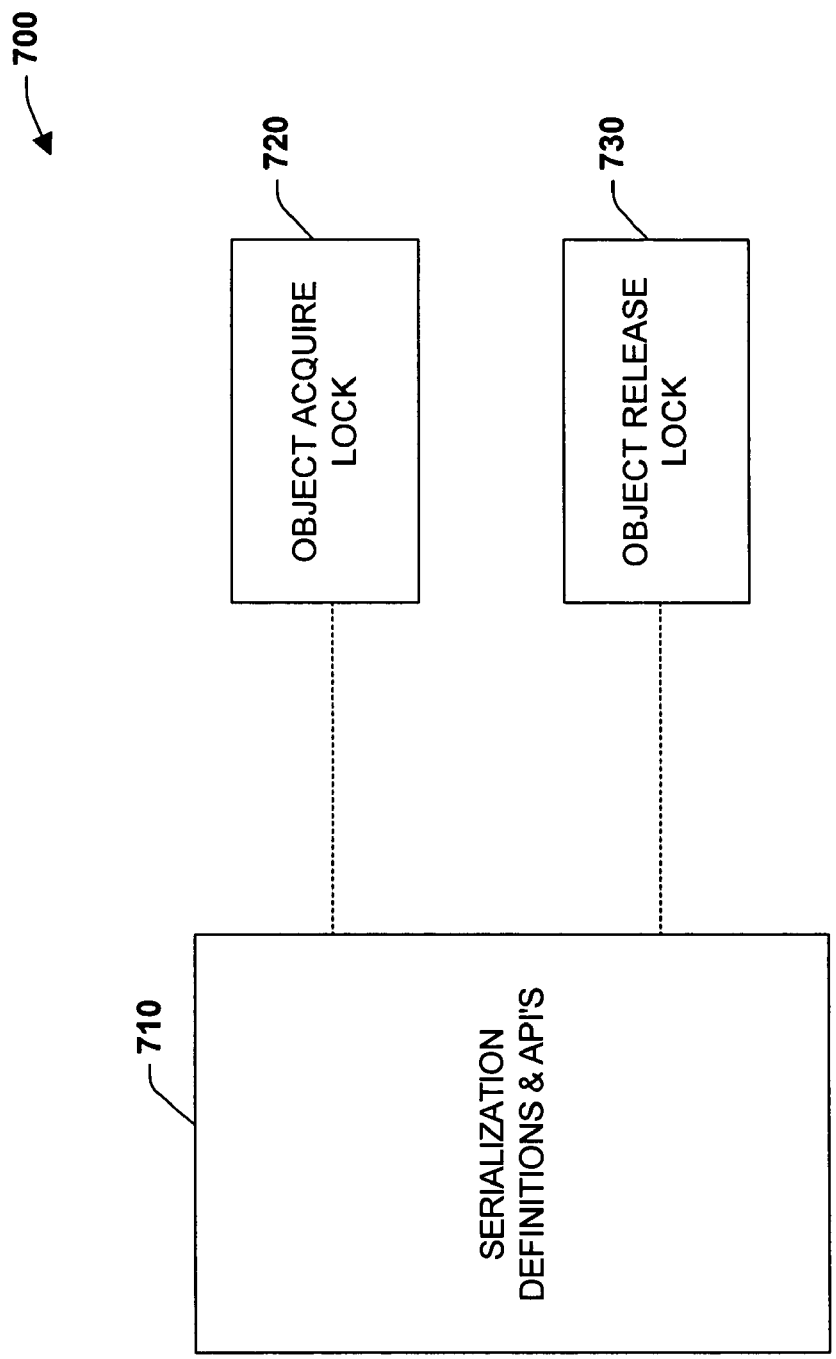
FIG. 7 is a diagram illustrating example serialization definitions and Application Programming Interfaces in accordance with an aspect of the present invention.

FIG. 7 depicts a system 700 illustrating example serialization definitions and Application Programming Interfaces 710 in accordance with an aspect of the present invention. The following describes definitions and API's 720 and 730 for serialization that are common across the framework. In addition, objects may have additional API's specific to their pipeline stage for controlling serialization.

```
typedef enum _WDF_SERIALIZATION_SCOPE {
    WdfSerializationScopeNoneSpecified = 0x00,
    WdfSerializationScopeDevice,
    WdfSerializationScopeObject
} WDF_SERIALIZATION_SCOPE;
typedef enum _WDF_EXECUTION_LEVEL {
    WdfExecutionLevelNoneSpecified = 0x00,
    WdfExecutionLevelPassive,
    WdfExecutionLevelDispatch
} WDF_EXECUTION_LEVEL;
typedef struct _WDF_CALLBACK_CONSTRAINTS_CONFIG {
    ULONG                    Size;
    WDF_SERIALIZATION_SCOPE  SerializationScope;
    WDF_EXECUTION_LEVEL      ExecutionLevel;
    BOOLEAN                  SaveFloatingPointState;
} WDF_CALLBACK_CONSTRAINTS_CONFIG,
*PWDF_CALLBACK_CONSTRAINTS_CONFIG;
VOID
FORCEINLINE
WDF_CALLBACK_CONSTRAINTS_INIT(
    PWDF_CALLBACK_CONSTRAINTS_CONFIG Config
    )
{
    RtlZeroMemory(Config, sizeof(WDF_CALLBACK_CONSTRAINTS_CONFIG));
    Config->Size = sizeof(WDF_CALLBACK_CONSTRAINTS_CONFIG);
    Config->SerializationScope = WdfSerializationScopeNoneSpecified;
    Config->ExecutionLevel = WdfExecutionLevelNoneSpecified;
    Config->SaveFloatingPointState = FALSE;
}
         At 720, an acquire lock API is defined as follows:
VOID
WdfObjectAcquireLock(
    IN WDFHANDLE Object
```

-continued

```
);
    WdfObjectAcquireLock acquires the serialization lock for the specified object.
Parameters
    Object
        Handle to the object.
Include
    wdf.h
Comments
```

This begins a serialization block. This API will wait until any event handlers on the object are no longer running and acquire the serialization lock for the object. If the object has configured WdfExecutionLevelPassive, the caller should be running at PASSIVE_LEVEL, and returns at PASSIVE_LEVEL. If the object has not configured WdfExecutionLevelPassive, the caller can be running at any level, but returns at DISPATCH_LEVEL. This is because an event handler could pre-empt the current thread if it was not raised to DISPATCH_LEVEL.

At 730, an a release lock API is defined as follows:

```
VOID
WdfObjectReleaseLock(
    IN WDFHANDLE Object
    );
        WdfObjectReleaseLock releases the serialization
        lock for the specified object.
Parameters
    Object
        Handle to the object.
Include
    wdf.h
Comments
```

This ends a serialization block allowing other event handlers to execute on the object.

Figure 8:
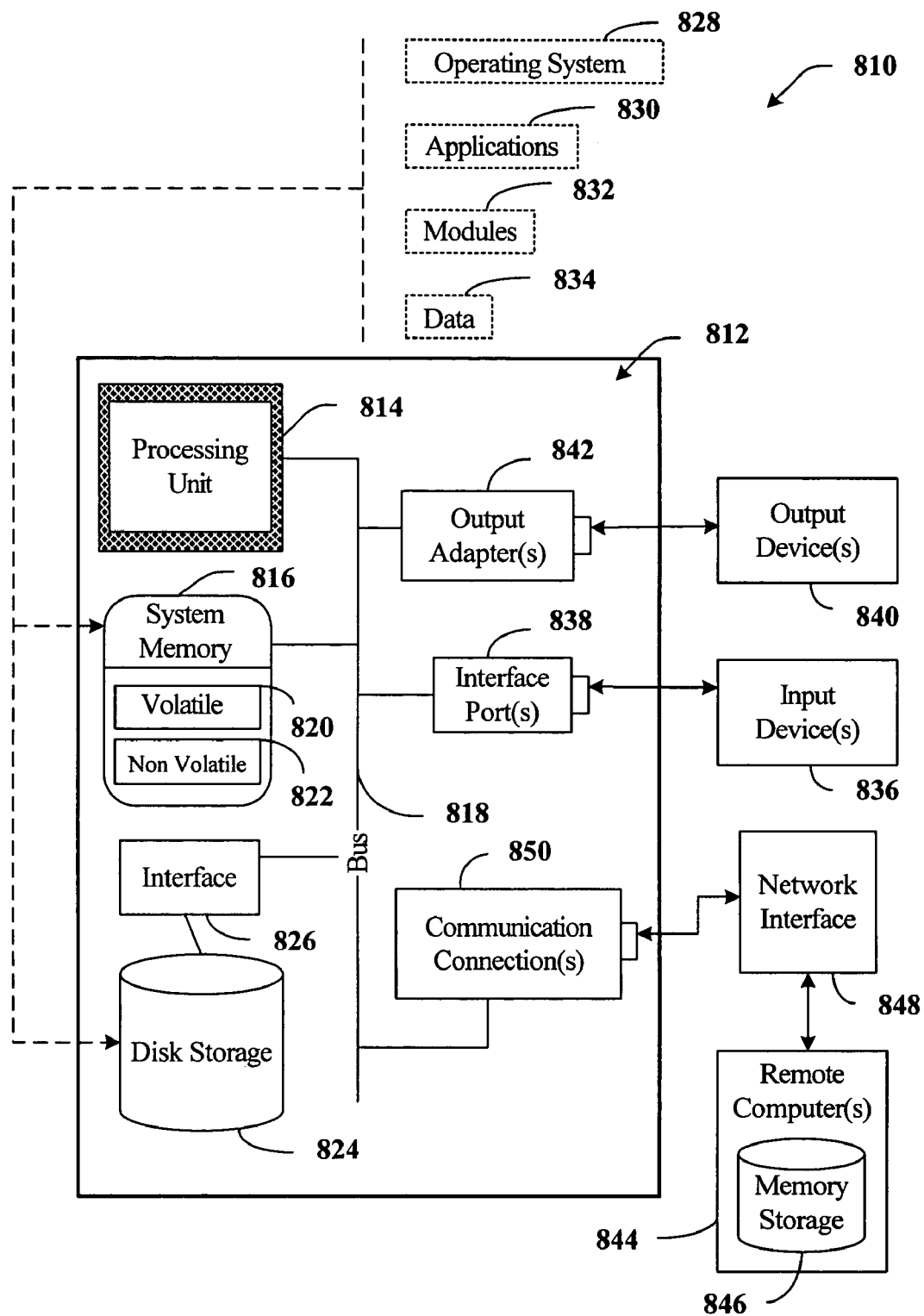
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
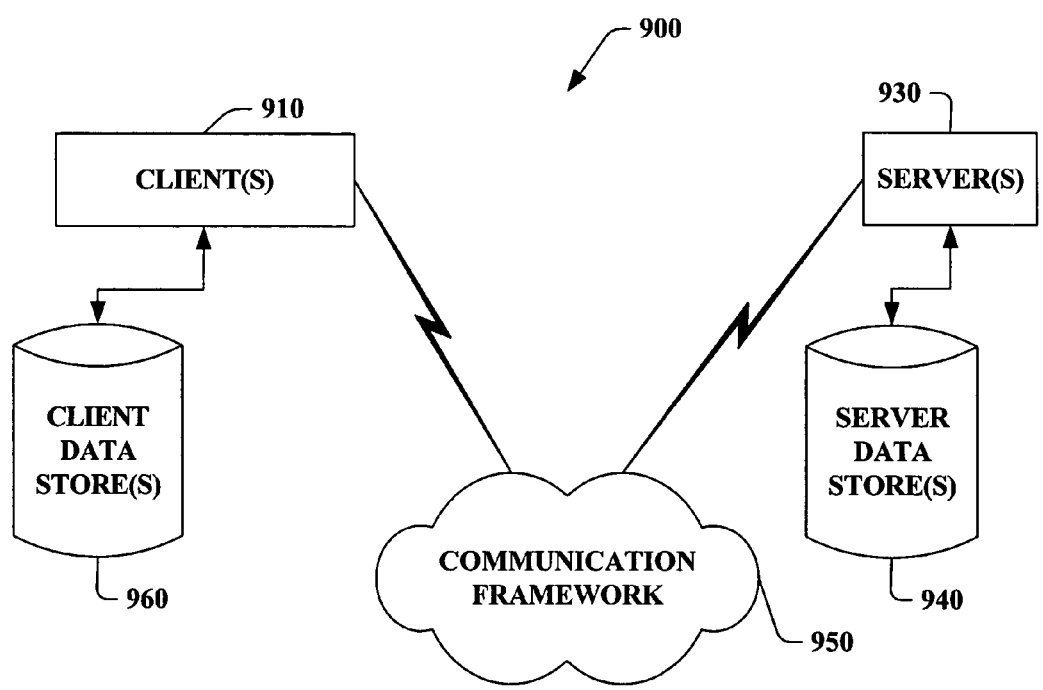
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-based event handling system, recorded on a computer-readable medium and capable of execution by a computer, comprising:
    a computer process that executes the following software components;
    a framework component that supplies classes of objects that can raise events;
    a synchronization component that controls in part synchronization of access to data based on categorization of at least one of objects and instances defined by the framework, and provides automatic serialization for events raised by the classes of objects, the events are managed by the framework or synchronization component to allow one or more aspects of the events to occur in a one-time manner and in accordance with a serialized process; and
    a configuration component that enables the client component to disable or enable automated serialization and synchronization;
    wherein the framework is supplied by an operating system or as a library for use by the operating system, wherein at least one of the framework and synchronization component automatically manages or serializes the events in order that a client component can process client-specific tasks;
    wherein the framework component allows a device driver to allocate additional memory, such that the device driver stores its working data in this allocated object extension memory and relies on the framework component for concurrency management and serialization.

2. The system of claim 1, the client component is a device driver.

3. The system of claim 1, the events are processed as part of a request.

4. The system of claim 1, the object provides a handle to enable the client component to manipulate the object and request additional local memory to be allocated for processing client tasks.

5. The system of claim 4, the configuration component includes one or more Application Programming Interfaces to facilitate selection of serialization and synchronization features.

6. The system of claim 1, the framework component provides events to a device driver though a series of callback functions registered by the device driver.

7. The system of claim 6, the device driver generally queues a handler or starts Input/Output (I/O) on the handler, marking state, and then returns.

8. The system of claim 1, the framework component is structured in accordance with state full objects that allow a device driver to register events, and provide API's.

9. The system of claim 1, the events are associated with a pipeline.

10. The system of claim 9, the pipeline includes at least one of a dispatch component, a plug and play component, a device model component, and an Input/Output component.

11. The system of claim 9, the pipeline employs a series of stages that a request traverses in the processing of a Driver Model request or an I/O Request Packet (IRP).

12. The system of claim 11, further comprising objects within each stage of the pipeline that raise an event to a device driver through an event callback to allow the driver to have control of which action to take, or provide some default action that may result in the requests completion, or forwarding to the next stage.

13. The system of claim 12, further comprising a processing component to determine whether a request reaches an end of the pipeline without being accepted by the device driver or by automatic processing in a respective stage, otherwise a default processing of the request occurs.

14. The system of claim 13, the default processing depends on whether the driver is configured as a Filter Driver in which the request is forwarded to a next lower device driver, or a non-filter driver in which the request is completed with a STATUS_INVALID_DEVICE_REQUEST.

15. The system of claim 1, further comprising one or more data packets that are employed to facilitate communications between the components via at least one of a local processing system, a local network system, and a remote network system.

16. A computer readable medium having computer readable instructions stored thereon for implementing the framework component and the synchronization component of claim 1.

17. A method to facilitate event processing in accordance with an operating system, comprising:
- defining at least one rule for processing an event;
- defining at least one object responsive to the event, the object categorized according to a framework;
- automatically serializing the event in accordance with at least one other event;
- configuring automatic serialization of the event;
- disabling or enabling automated serialization and synchronization; and
- allocating additional memory and storing working data in this allocated object extension memory.

18. The method of claim 17, further comprising automatically serializing the event in accordance with at least one of an operating system process and the framework.

19. The method of claim 17, further comprising enabling a client component to disable automatic serialization of events.

20. The method of claim 19, further comprising providing a local memory to facilitate client-specific processing.

21. A computer readable medium having a data structure stored thereon, comprising:
- a first data field related to a framework object having a handle associated therewith to facilitate data access;
- a second data field that relates to a client component that communicates via the handle and receives events from the framework object; and
- a third data field that automatically serializes the events, and enables the client component to disable or enable automated serialization and synchronization;
- wherein the first data field allows a device driver to allocate additional memory, such that the device driver stores its working data in this allocated object extension memory and relies on the framework object for concurrency management and serialization.

22. The computer readable medium of claim 21, further comprising at least one Application Programming Interface (API).

23. The computer readable medium of claim 12, the API includes at least one of a scope object, a scope device and a scope specified data structure.

24. The computer readable medium of claim 12, the API includes at least one of an execution level passive, an execution level dispatch, and an execution level specified data structure.

25. The computer readable medium of claim 12, further comprising an acquire lock data structure and a release lock data structure.

* * * * *